(No Model.)
T. S. BAILEY.
DRAFT ATTACHMENT FOR VEHICLES.
No. 579,692. Patented Mar. 30, 1897.
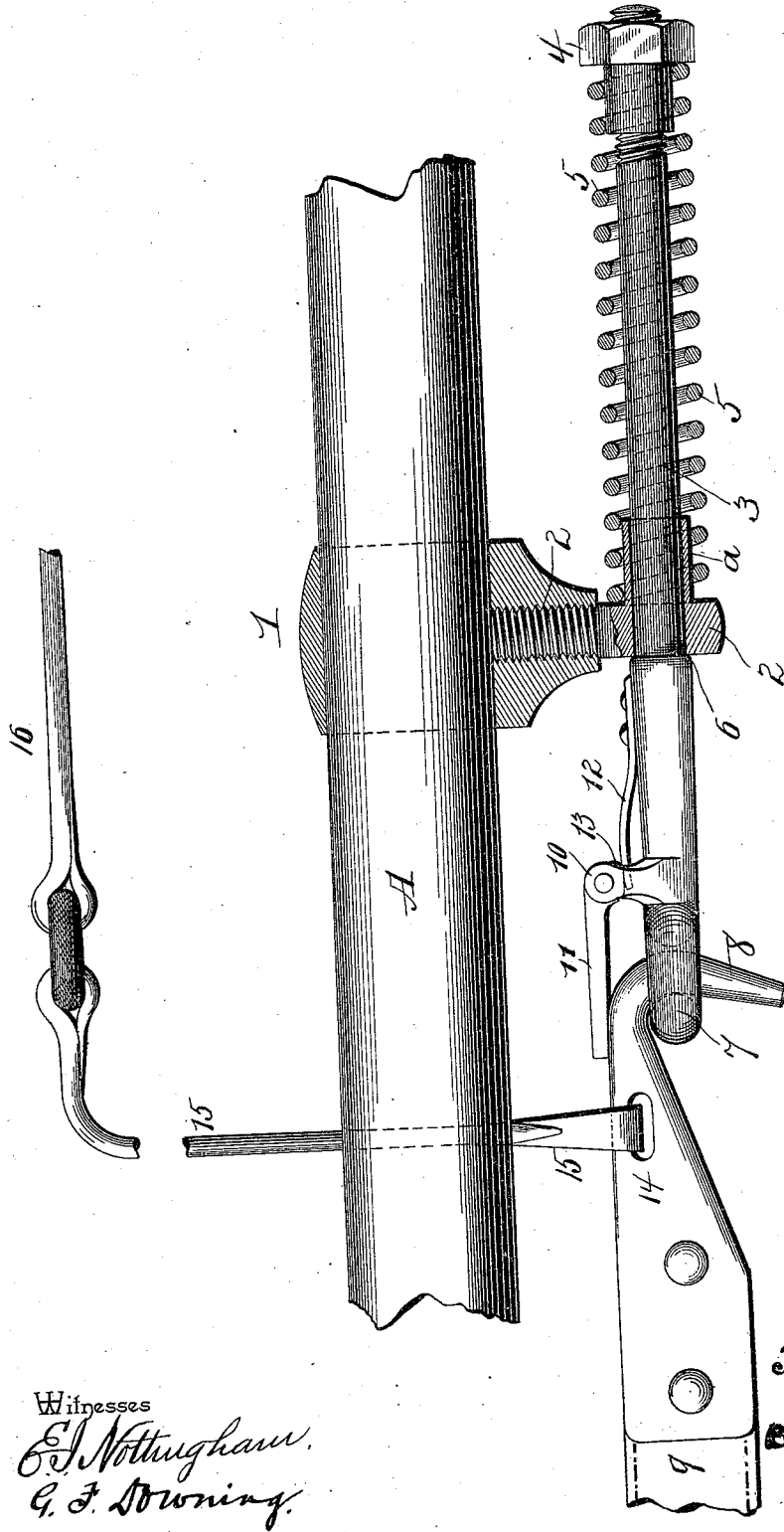
Witnesses
E. J. Nottingham.
G. F. Downing.
Inventor
T. S. Bailey
By H. A. Seymour
Attorney

UNITED STATES PATENT OFFICE.

THOMAS S. BAILEY, OF SANDY LAKE, PENNSYLVANIA.

DRAFT ATTACHMENT FOR VEHICLES.

SPECIFICATION forming part of Letters Patent No. 579,692, dated March 30, 1897.

Application filed July 28, 1896. Serial No. 600,782. (No model.)

*To all whom it may concern:*

Be it known that I, THOMAS S. BAILEY, a resident of Sandy Lake, in the county of Mercer and State of Pennsylvania, have invented certain new and useful Improvements in Draft Attachments for Vehicles; and I do hereby declare the following to be a full, clear, and exact description of the invention, such as will enable others skilled in the art to which it appertains to make and use the same.

My invention relates to an improvement in draft attachments for vehicles; and it consists in certain novel features of construction and combinations and arrangements of parts, as hereinafter set forth, and pointed out in the claims.

The accompanying drawing illustrates an embodiment of my invention.

A represents a thill, on which a collar 1 is mounted and secured thereto by means of a screw-eye 2. The screw-eye 2 is made with a sleeve $a$ and serves as a bearing for a draft-rod 3, the rear end of which is screw-threaded for the reception of a nut 4, and against said nut one end of a coiled spring 5 has its bearing, the other end of said spring being adapted to bear against the screw-eye. The forward portion of the draft-rod is made with a shoulder 6, adapted to bear against the screw-eye. The forward end of the draft-rod 3 is made with an eye 7 for the reception of a hook 8, secured to the end of the tug 9. In rear of the eye 7 the draft-rod is made with ears 10, between which a tongue or latch 11 is pivotally connected and adapted to bear on the hook 8, whereby to prevent the latter from escaping from the eye 7 when the vehicle is running downhill. The tongue or latch 11 is maintained in contact with the hook 8 with a proper degree of pressure by means of a spring 12, one end of which is secured to the draft-iron and the other end adapted to bear against the rear end 13 of the tongue or latch.

A slot 14 is made in the hook 8 for the reception of a light strap 15, one of said straps being attached to each tug-hook.

It is intended to pass the straps 15 through or around the terrets on the back-band of the harness or saddle, there to connect with a suitable strap 16, running back with and attached to the line or dashboard at a convenient point to be operated by the driver. In case of accident or the horse becoming unmanageable the driver will grasp the strap 16 and by a sudden jerk raise the tug-hooks from the eyes at the ends of the draft-rods and thus release the horse.

My improvements are simple in construction and effectual in all respects in the performance of their functions.

Slight changes might be made in the details of construction of my invention without departing from the spirit thereof or limiting its scope, and hence I do not wish to limit myself to the precise details of construction herein set forth.

Having fully described my invention, what I claim as new, and desire to secure by Letters Patent, is—

1. The combination with a draft-rod, and a tug detachably connected thereto, of a cord or strap for effecting a release of the tug from the draft-rod, substantially as set forth.

2. The combination with a draft-rod having an eye, of a tug-hook adapted to engage said eye, and a spring-actuated tongue or latch constructed and adapted to bear on said hook and prevent its accidental escape from the eye, substantially as set forth.

3. The combination with a draft-rod having an eye, of a tug-hook adapted to engage said eye, ears on the draft-rod, a tongue or latch pivoted between said ears and adapted to bear on said hook to prevent its escape from the eye, and a spring secured to the draft-rod and adapted to bear against said tongue or latch whereby to press the latter on the hook, substantially as set forth.

4. The combination with a draft-rod having an eye, of a tug-hook adapted to engage said eye, and a strap or cord attached to said tug-hook and adapted to be operated by a driver, whereby to release the tug-hook from the draft-rod, substantially as set forth.

5. The combination with a draft-rod having an eye, of a tug-hook adapted to engage said eye, a yielding tongue or latch bearing on said hook, and flexible devices connected with the tug-hook and adapted to be operated by a driver whereby to detach the tug-hook from the draft-rod and release the horse, substantially as set forth.

In testimony whereof I have signed this specification in the presence of two subscribing witnesses.

THOMAS S. BAILEY.

Witnesses:
I. H. ROBB,
D. H. McWILLIAMS.